US012702120B2

(12) United States Patent
Arimoto et al.

(10) Patent No.: US 12,702,120 B2
(45) Date of Patent: Aug. 11, 2026

(54) METHOD FOR REARING ARTEMIAS, FEED FOR ARTEMIA, ARTEMIA AND ARTEMIA POPULATION

(71) Applicant: Nissui Corporation, Tokyo (JP)

(72) Inventors: Ippei Arimoto, Saiki (JP); Kagayaki Morishima, Saiki (JP); Kentaro Fujii, Saiki (JP)

(73) Assignee: Nissui Corporation, Tokyo (JP)

( * ) Notice: Subject to any disclaimer, the term of this patent is extended or adjusted under 35 U.S.C. 154(b) by 0 days.

(21) Appl. No.: 18/676,229

(22) Filed: May 28, 2024

(65) Prior Publication Data

US 2024/0306614 A1 Sep. 19, 2024

Related U.S. Application Data

(63) Continuation of application No. PCT/JP2022/043624, filed on Nov. 25, 2022.

(30) Foreign Application Priority Data

Dec. 1, 2021 (JP) ................................ 2021-195559

(51) Int. Cl.
*A01K 61/59* (2017.01)
*A23K 10/20* (2016.01)
(Continued)

(52) U.S. Cl.
CPC .............. *A01K 61/59* (2017.01); *A23K 10/20* (2016.05); *A23K 20/142* (2016.05); (Continued)

(58) Field of Classification Search
CPC .... A01K 61/59; A23K 20/142; A23K 20/147; A23K 20/163; A23K 20/20; A23K 50/80; A23K 10/20
See application file for complete search history.

(56) References Cited

U.S. PATENT DOCUMENTS

2006/0185609 A1* 8/2006 Sato ....................... A01K 67/30 119/230
2015/0164965 A1* 6/2015 Moshitzky ............. A23K 50/80 435/257.2
(Continued)

FOREIGN PATENT DOCUMENTS

CN 106386595 A 2/2017
CN 107455615 A 12/2017
(Continued)

OTHER PUBLICATIONS

Machine Translation of CN-110754402-B, W. Li, Oct. 26, 2021 (Year: 2021).*
(Continued)

*Primary Examiner* — Kimberly S Berona
*Assistant Examiner* — Katherine June Walter
(74) *Attorney, Agent, or Firm* — Banner & Witcoff, Ltd.

(57) ABSTRACT

Provided is a method for rearing Artemias in a feeding water tank, wherein a feed containing a mollusk-derived feed is poured into the feeding water tank. Provided is a feed for Artemia that contains a mollusk-derived feed. Provided is an Artemia which satisfies at least one of the following requirements at 6 days of age: body width being greater than 0.183 mm; body height being greater than 0.179 mm; and volume greater than 0.099 $mm^3$.

11 Claims, 2 Drawing Sheets

(51) Int. Cl.

| | |
|---|---|
| ***A23K 20/142*** | (2016.01) |
| ***A23K 20/147*** | (2016.01) |
| ***A23K 20/163*** | (2016.01) |
| ***A23K 20/20*** | (2016.01) |
| ***A23K 50/80*** | (2016.01) |

(52) U.S. Cl.

CPC .......... *A23K 20/147* (2016.05); *A23K 20/163* (2016.05); *A23K 20/20* (2016.05); *A23K 50/80* (2016.05)

(56) References Cited

U.S. PATENT DOCUMENTS

| | | | | |
|---|---|---|---|---|
| 2019/0082719 | A1* | 3/2019 | Sato | C12N 1/38 |
| 2022/0174916 | A1* | 6/2022 | Wang | A01K 61/10 |

FOREIGN PATENT DOCUMENTS

| | | | |
|---|---|---|---|
| CN | 110754402 | A | 2/2020 |
| CN | 112314811 | A | 2/2021 |
| CN | 112841455 | A | 5/2021 |
| JP | 62-126922 | | 6/1987 |
| JP | H06-105659 | A | 4/1994 |
| JP | H10-056977 | A | 3/1998 |
| JP | 2002-125601 | A | 5/2002 |
| JP | 2002-517987 | A | 6/2002 |
| JP | 2017-153437 | A | 9/2017 |
| JP | 2019-140915 | A | 8/2019 |
| WO | WO-99/065327 | A1 | 12/1999 |

OTHER PUBLICATIONS

"The Complete Guide to Artemia (Brine Shrimp)", Mike Gilbert and Bethany Watson, https://seahorse.org/library/articles/artemiaGuide.shtml (Year: 2002).*

"Artemia Culture Techniques for Marine Finfish Larval Rearing", Sekar Megarajan, Ravi Avadhanula, and R.D. Suresh for CMFRI Repository (Year: 2023).*

Nakagawa et al., "Effects of taurine-enriched early live food (rotifer and *Artemia nauplii*) on survival and growth of walleye pollock larvae," *The Aquiculture*, vol. 67, No. 2, pp. 157-170, 2019.

Nanbu et al., "A Method for Culturing Artemia," *Journal of University of Occupational and Environmental Health*, vol. 22, No. 4, pp. 383-391, 2000.

Sato et al., "Nutritional Quality of *Artemia salina* as a Living Feed for Fish Larvae," The SUISANZOSHOKU, vol. 35, No. 2, pp. 107-111, 1987.

International Search Report mailed Jan. 17, 2023 in International Application No. PCT/JP2022/043624.

International Preliminary Report on Patentability mailed Jan. 17, 2023 in International Application No. PCT/JP2022/043624.

Balachandar et al., "Influence of different diets on the growth, survival, fecundity and proximate composition of brine shrimp *Artemia franciscana* (Kellog, 1906)," Aquac Res. 2019; 50:376-389.

Extended European Search Report issued Jan. 22, 2025 in European Patent Application No. 22 901 206.7.

* cited by examiner

METHOD FOR REARING ARTEMIAS, FEED FOR ARTEMIA, ARTEMIA AND ARTEMIA POPULATION

CROSS-REFERENCE TO RELATED APPLICATIONS

This Application is a Continuation of Application PCT/JP2022/043624 filed on Nov. 25, 2022. Application PCT/JP2022/043624 claims priority from Application 2021-195559 filed on Dec. 1, 2021 in Japan. The entire contents of these applications are incorporated herein by reference in their entirety.

TECHNICAL FIELD

The present disclosure relates to a method for cultivating Artemia, feed for Artemia, Artemia and an Artemia population.

BACKGROUND ART

Various techniques have been developed for aquaculture of aquatic organisms. For example, Artemia, a small crustacean, is used as biological feed suitable for small aquatic organisms, such as young fry (e.g., Patent Document 1).

CITATION LIST

Patent Literature

Patent Document 1: JP S62-126922 A

SUMMARY OF INVENTION

Technical Problem

When Artemia is used as a live feed for aquatic organisms, the Artemia can also be reared contemporaneously with the rearing of the aquatic organisms. In this case, it is required to have the size of the Artemia as feed increased according to the growth of aquatic organisms. However, it is not easy to stably cultivate Artemia of an appropriate size according to the rearing amount and growth degree of aquatic organisms. The present disclosure has been made in view of the above, and an object of the present disclosure is to provide a technique related to stably cultivating Artemia of an appropriate size, and Artemia and an Artemia population cultivated based on this technique.

Solution to Problem

The present disclosure provides the following.

[1] A method for cultivating Artemia in a rearing tank, the method comprising:
providing feed comprising a mollusk-derived feed into the rearing tank.

[2] The method for cultivating Artemia according to [1], wherein the mollusk-derived feed comprises a mollusk-derived component in an amount of 5 mass % to 100 mass %.

[3] The method for cultivating Artemia according to [1] or [2], wherein the mollusk-derived feed is a shellfish-derived material.

[4] The method for cultivating Artemia according to any of [1] to [3], wherein the mollusk-derived feed is a powder.

[5] The method for cultivating Artemia according to any of [1] to [4], wherein the mollusk-derived feed comprises particles, and the particles have an average particle size of 10 μm to 300 μm.

[6] A method for cultivating Artemia in a rearing tank, the method comprising:
providing feed into the rearing tank,
wherein
the feed contains at least one component selected from the group consisting of glycogen, zinc, taurine, and a protein, and
when the feed contains glycogen, the feed has a content of glycogen of from 1.1 mass % to 27.6 mass % on a total amount basis,
in a case where the feed contains zinc, the feed has a content of zinc of from $5.0\times10^{-3}$ mass % to $251.1\times10^{-3}$ mass % on a total amount basis,
in a case where the feed contains taurine, the feed has a content of taurine of from 0.01 mass % to 6.9 mass % on a total amount basis, and
in a case where the feed contains protein, the feed has a content of protein of from 38.7 mass % to 88.4 mass % on a total amount basis.

[7] The method for cultivating Artemia according to any of [1] to [6], wherein the feed is provided into the rearing tank until the Artemia is 25 days old.

[8] Feed for Artemia, the feed comprising a mollusk-derived feed.

[9] The feed for Artemia according to [8], wherein the mollusk-derived feed comprises a mollusk-derived component in an amount of 5 mass % to 100 mass %.

[10] The feed for Artemia according to [8] or [9], wherein the mollusk-derived feed is a shellfish-derived material.

[11] The feed for Artemia according to [10], wherein the mollusk-derived feed is a powder.

[12] The feed for Artemia according to any of [8] to [11], wherein the mollusk-derived feed comprises particles, and the particles have an average particle size of 10 μm to 300 μm.

[13] The feed for Artemia according to any of [8] to [12], wherein
the mollusk-derived feed contains at least one component selected from the group consisting of glycogen, zinc, taurine, and protein, and
in a case where the mollusk-derived feed contains glycogen, the mollusk-derived feed has a content of glycogen from 1.1 mass % to 27.6 mass % on a total amount basis,
in a case where the mollusk-derived feed contains zinc, the mollusk-derived feed has a content of zinc from $5.0\times10^{-3}$ mass % to $251.1\times10^{-3}$ mass % on a total amount basis,
in a case where the mollusk-derived feed contains taurine, the mollusk-derived feed has a content of taurine from 0.01 mass % to 6.9 mass % on a total amount basis, and
in a case where the mollusk-derived feed contains protein, the mollusk-derived feed has a content of protein from 38.7 mass % to 88.4 mass % on a total amount basis.

[14] Artemia satisfying at least one of a body width greater than 0.183 mm, a body height greater than 0.179 mm, and a body volume greater than 0.099 $mm^3$ at 6 days after hatching.

[15] Artemia having a content of oleic acid of not less than 22 mass % in fatty acid composition.

[16] Artemia having a content of arachidonic acid of not less than 5 mass % in fatty acid composition.

[17] Artemia containing at least one component selected from the group consisting of zinc and taurine in an amount greater than that of Artemia fed with microalgae.

[18] Artemia having a ratio of a digestive tract width to a body length of not less than 0.03.

[19] Artemia having a body length of not less than 2 mm and satisfying formula (1) when the body length is x and a proportion of body width is y:

$$y \geq -0.0346x + 0.1501. \tag{1}$$

[20] An Artemia population having not fewer than 100 individuals and satisfying at least one of an average body width of not less than 0.205 mm, an average body height of not less than 0.204 mm, and an average body volume of not less than 0.118 $mm^3$ at 6 days after hatching.

[21] The Artemia population according to [20], wherein the Artemia population comprises Artemia individuals reared in the same environment.

[22] The Artemia population according to [20] or [21], wherein the Artemia population comprises Artemia individuals reared with the same feed.

Advantageous Effects of Invention

According to the present disclosure, there are provided the technique related to stably cultivating Artemia of an appropriate size, and the Artemia and the Artemia population cultivated based on this technique.

BRIEF DESCRIPTION OF DRAWING

FIGS. 1A and 1B are diagrams for explaining body length, body width, and body height of Artemia.

DESCRIPTION OF EMBODIMENTS

Figures 1A, 1B:
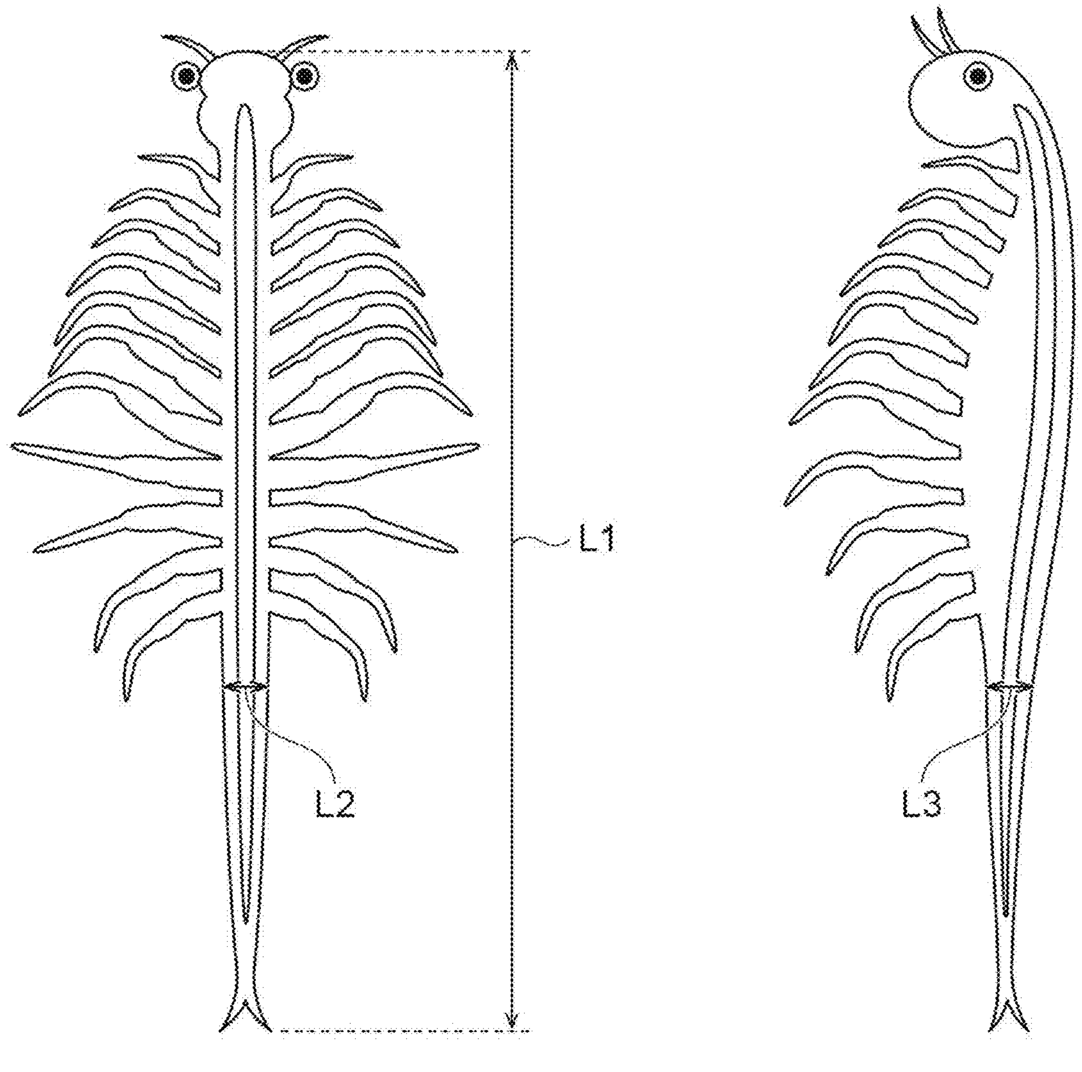
FIG. 1A is a plan view of Artemia.
FIG. 1B is a side view of Artemia.

In the present specification, numerical ranges indicated by "to" are ranges including the numerical values described before and after the "to" as the minimum and maximum values, respectively. In the present specification, in a case where a plurality of substances corresponding to each component is present in a composition, the amount of each component in the composition means the total amount of the plurality of substances present in the composition unless otherwise noted. In the present specification, the term "not more than" or "less than" with regard to a percentage includes 0%, that is, "not containing", or means a range including a value undetectable by existing means, unless the lower limit value is specifically stated.

Method for Cultivating Artemia

A method for cultivating Artemia according to the present disclosure is a method for cultivating Artemia in a rearing tank, the method comprising providing a feed comprising a mollusk-derived feed into the rearing tank. The mollusk-derived feed is scheduled to be fed during the cultivation of Artemia, and this can promote the growth of Artemia. The growth in the present specification includes an increase in any one or more of body length, body width, and body volume. Specifically, comparing individual Artemia of the same age with each other, individual Artemia cultivated using a feed comprising the mollusk-derived feed can grow larger than individual Artemia cultivated using another feed. In the present disclosure, the growth of Artemia includes an increase in body length and an increase in body width. For feed used during the rearing of Artemia, microalgae (such as Nannochloropsis and Chlamydomonas) have been used. In addition, to increase Artemia size, performing nutritional enrichment using an organic feed and/or the like has also been considered. In contrast to this, including a mollusk-derived feed in the feed can promote the growth of Artemia. Furthermore, promoting the growth of Artemia enables stable cultivation of Artemia with a certain size. This in turn enables the cultivation of Artemia in a stable amount in the case of using Artemia as a feed, enabling stable utilization of Artemia as a biological feed.

Hereinafter, details will be described.

Artemia is the name of a genus of the family Artemiidae of the order Anostraca of the subclass Sarsostraca of the class Branchiopoda of the subphylum Crustacea of Arthropoda. "Artemia" described below refers to an organism of various species included in the genus Artemia.

Artemia may be used as feed for rearing larvae of aquatic organisms, such as fish or cephalopods. For that purpose, Artemia may be cultivated in a rearing tank different from that of the aquatic organisms to be reared. In the following embodiments, cases of cultivating Artemia thus in a rearing tank will be described. However, the Artemia according to the present disclosure is not limited to those applied to feed for aquatic organisms.

In the present specification, rearing Artemia from hatching to adult is referred to as the "cultivation" of Artemia.

Usually, in cultivating Artemia, a salt water with a salt concentration of 1.0 mass % to 4.0 mass % is stored in a rearing tank, and Artemia is placed in the salt water and reared. Seawater may be used as the salt water. During the course, in the method for cultivating Artemia according to the present disclosure, a feed comprising mollusk-derived feed is provided into the rearing tank for rearing Artemia.

The mollusk-derived feed is a feed comprising a mollusk-derived component. The mollusk-derived feed may be, for example, a shellfish. The "mollusk" in the present specification refers to an animal included in the phylum Mollusca. The phylum Mollusca is classified into nine classes: Solenogastres, Caudofoveata, Polyplacophora, Monoplacophora, Bivalvia, Scaphopoda, Gastropoda, Polyplacophora, and Cephalopoda. The "shellfish" refers to an animal included in five classes: Monoplacophora, Bivalvia, Scaphopoda, Polyplacophora, and Gastropoda, among the above eight classes.

The type of shellfish to be used in the mollusk-derived feed is not particularly limited, and for example, a scallop, an oyster, and/or the like can be used. In addition, a plurality of shellfish-derived materials may be used as the feed, or a feed obtained using a mollusk other than shellfish may be used as the mollusk-derived feed. Using a shellfish can increase the proportion of at least one component selected from the group consisting of glycogen, zinc, taurine, and protein than using a mollusk other than shellfish. These components can contribute to the growth of Artemia. Thus, using a shellfish as the mollusk-derived feed can achieve stable cultivation of Artemia of an appropriate size.

In addition, a mollusk may be used in its entirety as feed, or only a portion of it may be used as feed. For example, for the shellfish, the whole including the shell may be used as the feed, or parts other than the shell may be used as the feed. Including the shell in the shellfish for the mollusk-derived feed allows Artemia to ingest inorganic components, such as calcium carbonate, and proteins contained in the shell, and this may promote the growth of Artemia. Feeding calcium carbonate to Artemia can supply calcium as a bone component to aquatic organisms fed with Artemia as biological feed. This promotes the growth of bones of the aquatic organisms and can increase the body length of the aquatic organisms.

For the mollusk-derived feed, a shellfish-derived material may be used. The mollusk-derived feed may be a liquid or a solid. Examples of the liquid include a fluid produced by finely grinding a mollusk and a liquid extracted by subjecting a mollusk to a given treatment. In addition, for example, a finely ground mollusk may be diluted with water to form a liquid feed. Furthermore, a mollusk finely ground with a mixer or the like may be filtered through a mesh to extract an extract as a liquid. Moreover, for the mollusk, a frozen product may be thawed and used.

On the other hand, examples of the solid include powder feed that is easily ingested by Artemia with a small body length after hatching. Examples of the "powder" include particles with an average particle size of 10 μm to 300 μm. The average particle size may be from 10 μm to 200 μm or may be from 10 μm to 100 μm. A powder feed with an average particle size in the above range is easily ingested even by larvae approximately from 0 to 3 days old shortly after hatching. In addition, the "powder" may be composed of particles with a particle size in a given range. The lower limit of the particle size of the particles contained in the powder may be 3 μm, 5 μm, 10 μm, or 20 μm. Furthermore, the upper limit of the particle size may be 300 μm, 200 μm, 100 μm, 50 μm, or 30 μm.

The particle size of the powder can be measured with an image analyzer VHX-900 (KEYENCE CORPORATION). The average particle size can be determined by calculation based on the measurement result of the particle size. For example, for particles with an average particle size of 10 μm to 300 μm, the particle sizes of about 400 particles are each measured using an image analyzer. The average particle size can be determined by calculating the arithmetic mean value of the measured values. Here, the particle size is a diameter in the case where each particle is a sphere, or a length of a diagonal line in the case where each particle is a quadrilateral. That is, the diameter of the circumscribed circle of the particle shown in the two-dimensional image is the particle size. The average particle size of the particles contained in the powder may be adjusted by separating the particles into a plurality of groups such as by sieving. The powder thus separated and adjusted to have an average particle size in a given range may be used as the feed. In the case of using also the shell part of a shellfish as the feed, it is suitable to powder the shellfish. That is, a powder may be used as the mollusk-derived feed.

The mollusk-derived feed may comprise a mollusk-derived component in an amount of 5 mass % to 100 mass %, of 10 mass % to 100 mass %, of 20 mass % to 100 mass %, of 30 mass % to 100 mass %, of 40 mass % to 100 mass %, of 50 mass % to 100 mass %, of 60 mass % to 100 mass %, or of 70 mass % to 100 mass %, or may comprise in an amount of 5 mass % to 90 mass %, of 5 mass % to 80 mass %, of 5 mass % to 70 mass %, of 5 mass % to 60 mass %, or of 5 mass % to 50 mass %. The lower limit of the content of the mollusk-derived component may be not less than 5 mass %, not less than 10 mass %, not less than 20 mass %, not less than 30 mass %, not less than 40 mass %, not less than 50 mass %, not less than 60 mass %, or not less than 70 mass %. In addition, the upper limit of the content of the mollusk-derived component may be not more than 100 mass %, not more than 90 mass %, not more than 80 mass %, not more than 70 mass %, not more than 60 mass %, or not more than 50 mass %. Examples of a component other than the mollusk-derived component in the mollusk-derived feed include feeding attractants and fish oils, such as water, sodium chloride, potassium chloride, magnesium chloride, magnesium sulfate, calcium sulfate, calcium chloride, krill meals, and cuttlefish liver meals. With a high proportion of the mollusk-derived component, a component specific to a mollusk can promote the growth of Artemia.

In the case where the feed to be fed into a tank for rearing Artemia comprises a feed other than the mollusk-derived feed, the feed may comprise, as the feed other than the mollusk-derived feed, a feed that has been known as feed for Artemia in the art, such as, for example, algae feed, roasted soybean flour, or fish meal.

The feed comprising the mollusk-derived feed can be a feed comprising a larger amount of a specific component than feed that has been used for Artemia in the art. That is, the method for cultivating Artemia according to the present disclosure is a method for cultivating Artemia in a rearing tank, and the feed to be fed into the rearing tank may contain at least one component selected from the group consisting of glycogen, zinc, taurine, and protein. In addition, in a case where the feed contains glycogen, the feed may have a content of glycogen of from 1.1 mass % to 27.6 mass %, from 5 mass % to 27.6 mass %, from 10 mass % to 27.6 mass %, from 16 mass % to 27.6 mass %, from 1.1 mass % to 22 mass %, from 1.1 mass % to 16 mass %, or from 1.1 mass % to 10 mass % on a total amount basis. The lower limit of the content of glycogen may be not less than 1.1 mass %, not less than 3 mass %, not less than 5 mass %, not less than 7 mass %, 10 mass %, not less than 13 mass %, not less than 16 mass %, not less than 19 mass %, not less than 22 mass %, or not less than 25 mass %. The upper limit of the content of glycogen may be not more than 27.6 mass %, not more than 25 mass %, not more than 22 mass %, not more than 19 mass %, not more than 16 mass %, not more than 13 mass %, not more than 10 mass %, not more than 8 mass %, not more than 5 mass %, or not more than 3 mass %.

In addition, in a case where the feed contains zinc, the feed may have a content of zinc of from $5.0\times10^{-3}$ mass % to $251.1\times10^{-3}$ mass %, from $10.0\times10^{-3}$ mass % to $251.1\times10^{-3}$ mass %, from $25.8\times10^{-3}$ mass % to $251.1\times10^{-3}$ mass %, from $50\times10^{-3}$ mass % to $251.1\times10^{-3}$ mass %, from $100\times10^{-3}$ mass % to $251.1\times10^{-3}$ mass %, from $150\times10^{-3}$ mass % to $251.1\times10^{-3}$ mass %, from $25.8\times10^{-3}$ mass % to $200\times10^{-3}$ mass %, from $25.8\times10^{-3}$ mass % to $150\times10^{-3}$ mass %, from $25.8\times10^{-3}$ mass % to $100\times10^{-3}$ mass %, from $25.8\times10^{-3}$ mass % to $50\times10^{-3}$ mass %, from $5.0\times10^{-3}$ mass % to $200\times10^{-3}$ mass %, from $5.0\times10^{-3}$ mass % to $150\times10^{-3}$ mass %, from $5.0\times10^{-3}$ mass % to $100\times10^{-3}$ mass %, or from $5.0\times10^{-3}$ mass % to $5.0\times10^{-3}$ mass % on a total amount basis. The lower limit of the content of zinc may be not less than $5.0\times10^{-3}$ mass %, not less than $10.0\times10^{-3}$ mass %, not less than $25.8\times10^{-3}$ mass %, not less than $50\times10^{-3}$ mass %, not less than $100\times10^{-3}$ mass %, or not less than $150\times10^{-3}$ mass %. The upper limit of the content of zinc may be not more than $251.1\times10^{-3}$ mass %, not more than $200\times10^{-3}$ mass %, not more than $150\times10^{-3}$ mass %, not more than $100\times10^{-3}$ mass %, or not more than $50\times10^{-3}$ mass %.

In a case where the feed contains taurine, the feed may have a content of taurine of from 0.01 mass % to 6.9 mass %, from 0.02 mass % to 6.9 mass %, from 1.2 mass % to 6.9 mass %, from 3 mass % to 6.9 mass %, from 5 mass % to 6.9 mass %, from 1.2 mass % to 5 mass %, from 1.2 mass % to 3 mass %, from 0.01 mass % to 5 mass %, or from 0.02 mass % to 3 mass % on a total amount basis. The lower limit may be not less than 0.01 mass %, not less than 0.02 mass %, not less than 1.2 mass %, not less than 3 mass %, or not less than 5 mass %. The upper limit may be not more than 6.9 mass %, not more than 5 mass %, or not more than 3 mass %.

In a case where the feed contains a protein, the feed may have a content of the protein of from 38.7 mass % to 88.4 mass %, from 45 mass % to 88.4 mass %, from 50 mass % to 88.4 mass %, from 60 mass % to 88.4 mass %, from 38.7 mass % to 80 mass %, from 38.7 mass % to 70 mass %, from 38.7 mass % to 60 mass %, from 38.7 mass % to 50 mass %, or from 38.7 mass % to 40 mass % on a total amount basis. The lower limit of the content of protein may be not less than 38.7 mass %, not less than 45 mass %, not less than 50 mass %, or not less than 60 mass %. The upper limit of the content of the protein may be not more than 88.4 mass %, not more than 80 mass %, not more than 70 mass %, not more than 60 mass %, not more than 50 mass %, or not more than 40 mass %.

Cultivating Artemia using the feed containing the components described above can promote the growth of Artemia. Specifically, in comparison of Artemia individuals of the same age with each other, Artemia individuals cultivated using the feed described above can grow larger than Artemia individuals cultivated using another feed. For feed used during the rearing of Artemia in the art, a feed derived from microalgae has been used; for example, nutritional enrichment can be performed using an organic feed or the like. In contrast to this, including the mollusk-derived feed in a feed can promote the growth of Artemia without performing nutritional enrichment. Thus, this makes it possible to stably cultivate Artemia of an appropriate size.

The feed comprising the mollusk-derived feed is preferably given until Artemia is 25 days old but may be given after the age of 25 days. In the present disclosure, the days after hatching refers to the number of days elapsing from hatching, the number expressed in days, with the day of hatching being 0 day after hatching. The period from the hatching of Artemia to 25 days after hatching is a period when Artemia grows with the passage of days after hatching. Cultivating Artemia using the feed comprising the mollusk-derived feed in such a period can increase Artemia size.

The feed comprising the mollusk-derived feed may be scheduled to be given only during a portion of the period until the Artemia is 25 days old. For example, the feed comprising a mollusk-derived feed may be used only from 0 day after hatching to 15 days after hatching, or feed comprising a mollusk-derived feed may be used only from 0 day after hatching to 10 days after hatching. In addition, the feed comprising a mollusk-derived feed may be scheduled to be given, for example, in one or some of a plurality of feedings in the timing of giving the feed from 0 day after hatching to 25 days after hatching. Specifically, the timing of giving the feed comprising a mollusk-derived feed may be once daily, once in two days, or once in three days. However, the timing is not limited to such a schedule.

Feed for Artemia

A feed for Artemia according to the present disclosure can comprise a mollusk-derived feed as described above.

The mollusk-derived feed is a feed comprising a mollusk-derived component. The mollusk-derived feed may be, for example, a shellfish. The "mollusk" in the present specification refers to an animal included in the phylum Mollusca. The phylum Mollusca is classified into nine classes: Solenogastres, Caudofoveata, Polyplacophora, Monoplacophora, Bivalvia, Scaphopoda, Gastropoda, Polyplacophora, and Cephalopoda. The "shellfish" refers to an animal included in five classes: Monoplacophora, Bivalvia, Scaphopoda, Polyplacophora, and Gastropoda, among the above eight classes.

The type of shellfish to be used in a mollusk-derived feed is not particularly limited, and for example, a scallop, an oyster, and/or the like can be used. In addition, a plurality of shellfish-derived materials may be used as in a feed, or a feed obtained using a mollusk other than shellfish may be used as the mollusk-derived feed. Using a shellfish can increase the proportion of at least one component selected from the group consisting of glycogen, zinc, taurine, and a protein than using a mollusk other than shellfish. These components can contribute to the growth of the Artemia. Thus, using a shellfish as the mollusk-derived feed can achieve stable cultivation of the Artemia of an appropriate size.

In addition, a mollusk may be used in its entirety as feed, or only a portion of it may be used as feed. For example, for the shellfish, the whole including the shell may be used as the feed, or parts other than the shell may be used as the feed. Including the shell in the shellfish for the mollusk-derived feed allows the Artemia to ingest inorganic components, such as calcium carbonate, and proteins contained in the shell, and this may promote the growth of the Artemia. Feeding calcium carbonate to the Artemia can supply calcium as a bone component to aquatic organisms fed with the Artemia as a biological feed. This promotes the growth of bones of the aquatic organisms and can increase the body length of the aquatic organisms.

For the mollusk-derived feed, a shellfish-derived material may be used. The mollusk-derived feed may be a liquid or a solid. An example of the liquid may be a fluid produced by finely grinding a mollusk or a liquid extracted by subjecting a mollusk to a given treatment. In addition, for example, a finely ground mollusk may be diluted with, for example, water to form a liquid feed. Furthermore, a mollusk finely ground with a mixer or the like may be filtered through a mesh to extract an extract as a liquid. Moreover, for the mollusk, a frozen product may be thawed and used.

On the other hand, examples of a solid include a powder feed that is easily ingested by the Artemia having a small body length after hatching. Examples of the "powder" include particles with an average particle size of 10 μm to 300 μm. The average particle size may be from 10 μm to 200 μm or may be from 10 μm to 100 μm. The powder feed with an average particle size in the above range is easily ingested even by larvae approximately from 0 to 3 days old shortly after hatching. In the case of using also the shell part of a shellfish as the feed, it is suitable to powder the shellfish. That is, a powder may be used as the mollusk-derived feed.

The mollusk-derived feed may comprise a mollusk-derived component in an amount of 5 mass % to 100 mass %, of 10 mass % to 100 mass %, of 20 mass % to 100 mass %, of 30 mass % to 100 mass %, of 40 mass % to 100 mass %, of 50 mass % to 100 mass %, of 60 mass % to 100 mass %, or of 70 mass % to 100 mass %, or may comprise in an amount of 5 mass % to 90 mass %, of 5 mass % to 80 mass %, of 5 mass % to 70 mass %, of 5 mass % to 60 mass %, or of 5 mass % to 50 mass %. The lower limit of the content of the mollusk-derived component may be not less than 5 mass %, not less than 10 mass %, not less than 20 mass %, not less than 30 mass %, not less than 40 mass %, not less than 50 mass %, not less than 60 mass %, or not less than 70 mass %. The upper limit of the content of the mollusk-derived component may be not more than 100 mass %, not more than 90 mass %, not more than 80 mass %, not more than 70 mass %, not more than 60 mass %, or not more than 50 mass %. Examples of a component other than the mollusk-derived component in the mollusk-derived feed include feeding attractants and fish oils, such as water, sodium chloride, potassium chloride, magnesium chloride, magnesium sulfate, calcium sulfate, calcium chloride, krill meals, and cuttlefish liver meals. With a high proportion of the mollusk-derived component, a component specific to a mollusk can promote the growth of the Artemia.

In the case where the feed to be fed into a tank for rearing Artemia comprises a feed other than a mollusk-derived feed, the feed may comprise, as the feed other than the mollusk-derived feed, a feed that has been known as a feed for Artemia in the art, such as, for example, algae feed, roasted soybean flour, or fish meal.

The feed comprising the mollusk-derived feed can be a feed comprising a larger amount of a specific component than feed that has been used for Artemia in the art. That is, the feed for Artemia according to the present disclosure is used for cultivating the Artemia in a rearing tank. The feed for Artemia to be fed into the rearing tank may contain at least one component selected from the group consisting of glycogen, zinc, taurine, and protein. In a case where the feed contains glycogen, the feed may have a content of glycogen of from 1.1 mass % to 27.6 mass % on a total amount basis. In a case where the feed contains zinc, the feed may have a content of zinc of from $25.8\times10^{-3}$ mass % to $251.1\times10^{-3}$ mass % on a total amount basis. In a case where the feed contains taurine, the feed may have a content of taurine of from 1.2 mass % to 6.9 mass % on a total amount basis. In a case where the feed contains a protein, the feed may have a content of a protein of from 38.7 mass % to 88.4 mass % on a total amount basis.

In a case where the feed contains glycogen, the feed may have a content of glycogen of from 1.1 mass % to 27.6 mass %, from 5 mass % to 27.6 mass %, from 10 mass % to 27.6 mass %, from 16 mass % to 27.6 mass %, from 1.1 mass % to 22 mass %, from 1.1 mass % to 16 mass %, or from 1.1 mass % to 10 mass % on a total amount basis. The lower limit of the content of glycogen may be not less than 1.1 mass %, not less than 3 mass %, not less than 5 mass %, not less than 7 mass %, not less than 10 mass %, not less than 13 mass %, not less than 16 mass %, not less than 19 mass %, not less than 22 mass %, or not less than 25 mass %. The upper limit of the content of glycogen may be not more than 27.6 mass %, not more than 25 mass %, not more than 22 mass %, not more than 19 mass %, not more than 16 mass %, not more than 13 mass %, not more than 10 mass %, not more than 8 mass %, not more than 5 mass %, or not more than 3 mass %.

In addition, in a case where the feed contains zinc, the feed may have a content of zinc of from $25.8\times10^{-3}$ mass % to $251.1\times10^{-3}$ mass %, from $50\times10^{-3}$ mass % to $251.1\times10^{-3}$ mass %, from $100\times10^{-3}$ mass % to $251.1\times10^{-3}$ mass %, from $150\times10^{-3}$ mass % to $251.1\times10^{-3}$ mass %, from $25.8\times10^{-3}$ mass % to $200\times10^{-3}$ mass %, from $25.8\times10^{-3}$ mass % to $150\times10^{-3}$ mass %, from $25.8\times10^{-3}$ mass % to $100\times10^{-3}$ mass %, or from $25.8\times10^{-3}$ mass % to $50\times10^{-3}$ mass %. The lower limit of the content of zinc may be not less than $25.8\times10^{-3}$ mass %, not less than $50\times10^{-3}$ mass %, not less than $100\times10^{-3}$ mass %, or not less than $150\times10^{-3}$ mass %. The upper limit of the content of zinc may be not more than $251.1\times10^{-3}$ mass %, not more than $200\times10^{-3}$ mass %, not more than $150\times10^{-3}$ mass %, not more than $100\times10^{-3}$ mass %, or not more than $50\times10^{-3}$ mass %.

In a case where the feed contains taurine, the feed may have a content of taurine of from 1.2 mass % to 6.9 mass %, from 3 mass % to 6.9 mass %, from 5 mass % to 6.9 mass %, from 1.2 mass % to 5 mass %, or from 1.2 mass % to 3 mass % on a total amount basis. The lower limit of the content of taurine may be not less than 1.2 mass %, not less than 3 mass %, or not less than 5 mass %. The upper limit of the content of taurine may be not more than 6.9 mass %, not more than 5 mass %, or not more than 3 mass %.

In a case where the feed contains a protein, the feed may have a content of a protein of from 38.7 mass % to 88.4 mass %, from 45 mass % to 88.4 mass %, from 50 mass % to 88.4 mass %, from 60 mass % to 88.4 mass %, from 38.7 mass % to 80 mass %, from 38.7 mass % to 70 mass %, from 38.7 mass % to 60 mass %, from 38.7 mass % to 50 mass %, or from 38.7 mass % to 40 mass % on a total amount basis. The lower limit of the content of a protein may be not less than 38.7 mass %, not less than 45 mass %, not less than 50 mass %, or not less than 60 mass %. The upper limit of the content of a protein may be not more than 88.4 mass %, not more than 80 mass %, not more than 70 mass %, not more than 60 mass %, not more than 50 mass %, or not more than 40 mass %.

Cultivating the Artemia using the feed containing the ingredients as described above can promote the growth of Artemia. Specifically, comparing Artemia individuals of the same age with each other, the Artemia individuals cultivated using the feed described above can grow larger than the Artemia individuals cultivated using another feed. For a feed used during rearing of the Artemia in the art, a feed derived from microalgae has been used; for example, nutritional enrichment can be performed using an organic feed or the like. In contrast to this, including a mollusk-derived feed in the feed can promote the growth of the Artemia without requiring nutritional enrichment. Thus, this makes it possible to stably cultivate Artemia of an appropriate size.

Artemia

Artemia according to the present disclosure is Artemia cultivated by the intake of the feed described above. A mollusk-derived feed may remain in the digestive tract of the Artemia. In this case, a mollusk-derived feed remaining in the digestive tract is also regarded as a portion of the Artemia and is subjected to a component analysis of the Artemia.

Artemia fed with a mollusk-derived feed according to the present disclosure may contain more zinc than Artemia fed with microalgae. In a case where the Artemia contains zinc, the content of zinc may be from $4.1\times10^{-3}$ mass % to $40.2\times10^{-3}$ mass, from $10\times10^{-3}$ mass % to $40.2\times10^{-3}$ mass %, from $15\times10^{-3}$ mass % to $40.2\times10^{-3}$ mass %, from $20\times10^{-3}$ mass % to $40.2\times10^{-3}$ mass %, from $25\times10^{-3}$ mass % to $40.2\times10^{-3}$ mass %, from $30\times10^{-3}$ mass % to $40.2\times10^{-3}$ mass %, from $35\times10^{-3}$ mass % to $40.2\times10^{-3}$ mass %, from $4.1\times10^{-3}$ mass % to $35\times10^{-3}$ mass %, from $4.1\times10^{-3}$ mass % to $30\times10^{-3}$ mass %, from $4.1\times10^{-3}$ mass % to $25\times10^{-3}$ mass %, from $4.1\times10^{-3}$ mass % to $20\times10^{-3}$ mass %, from $4.1\times10^{-3}$ mass % to $15\times10^{-3}$ mass %, or from $4.1\times10^{-3}$ mass % to $10\times10^{-3}$ mass % on a total amount basis. The lower limit of the content of zinc may be not less than $4.1\times10^{-3}$ mass %, not less than $10\times10^{-3}$ mass %, not less than $15\times10^{-3}$ mass %, not less than $20\times10^{-3}$ mass %, not less than $25\times10^{-3}$ mass %, not less than $30\times10^{-3}$ mass %, or not less than $35\times10^{-3}$ mass % on a total amount basis. The upper limit of the content of zinc may be not more than $40.2\times10^{-3}$ mass %, not more than $35\times10^{-3}$ mass %, not more than $30\times10^{-3}$ mass %, not more than $25\times10^{-3}$ mass %, not more than $20\times10^{-3}$ mass %, not more than $15\times10^{-3}$ mass %, or not more than $10\times10^{-3}$ mass %.

Artemia fed with a mollusk-derived feed according to the present disclosure may contain more taurine than Artemia fed with microalgae. In a case where the Artemia contains taurine, the content of taurine may be from 0.1 mass % to 1.1 mass %, from 0.2 mass % to 1.1 mass %, from 0.5 mass % to 1.1 mass %, from 0.8 mass % to 1.1 mass %, from 0.1 mass % to 0.8 mass %, from 0.1 mass % to 0.5 mass %, or from 0.1 mass % to 0.2 mass % on a total amount basis. The lower limit of the content of taurine may be not less than 0.1 mass %, not less than 0.2 mass %, not less than 0.5 mass %, or not less than 0.8 mass % on a total amount basis. The upper limit of the content of taurine may be not more than 1.1 mass %, not more than 0.8 mass %, not more than 0.5 mass %, or not more than 0.2 mass %. In one aspect, the amount of taurine contained in Artemia is increased, for example, by 10%, 20%, 30%, 50%, 70%, 200%, 300%, 400%, or 500% than that before feeding.

Artemia satisfying any of the above is likely to grow to a size appropriate for the feed used for rearing aquatic organisms, such as fish or cephalopods. Thus, Artemia satisfying any of the above contributes to the stable cultivation of Artemia with an appropriate size, which is suitable for continuous use as feed for aquatic organisms, for example. In addition, such Artemia is suitable for use as biological feed.

The body length of the Artemia according to the present disclosure at 6 days after hatching may be greater than 2.2 mm and less than 6.0 mm, greater than 2.3 mm and less than 6.0 mm, greater than 2.4 mm and less than 6.0 mm, greater than 2.5 mm and less than 6.0 mm, greater than 2.6 mm and less than 6.0 mm, greater than 2.7 mm and less than 6.0 mm, greater than 2.8 mm and less than 6.0 mm, greater than 2.9 mm and less than 6.0 mm, greater than 3.0 mm and less than 6.0 mm, greater than 2.2 mm and less than 5.5 mm, greater than 2.2 mm and less than 5.0 mm, greater than 2.2 mm and less than 4.5 mm, or greater than 2.2 mm and less than 4.0 mm. The lower limit of the body length at 6 days after hatching may be, for example, greater than 2.2 mm, greater than 2.3 mm, greater than 2.4 mm, greater than 2.5 mm, greater than 2.6 mm, greater than 2.7 mm, greater than 2.8 mm, greater than 2.9 mm, or greater than 3.0 mm. The upper limit of the body length at 6 days after hatching may be, for example, less than 6.0 mm, less than 5.5 mm, less than 5.0 mm, less than 4.5 mm, or less than 4.0 mm.

The body width of the Artemia at 6 days after hatching may be greater than 0.183 mm and less than 0.3 mm, greater than 0.19 mm and less than 0.28 mm, greater than 0.2 mm and less than 0.26 mm, greater than 0.183 mm, and less than 0.28 mm, or greater than 0.183 mm and less than 0.26 mm.

The body width of the Artemia at 6 days after hatching may be greater than 0.183 mm and less than 0.3 mm, greater than 0.19 mm and less than 0.3 mm, greater than 0.20 mm and less than 0.3 mm, greater than 0.183 mm, and less than 0.28 mm, or greater than 0.183 mm and less than 0.26 mm. The lower limit of the body width at 6 days after hatching may be greater than 0.183 mm, greater than 0.19 mm, or greater than 0.2 mm. The upper limit of the body width at 6 days after hatching may be, for example, less than 0.3 mm, less than 0.28 mm, or less than 0.26 mm.

The body height of the Artemia at 6 days after hatching may be greater than 0.179 mm and less than 0.3 mm, greater than 0.19 mm and less than 0.3 mm, greater than 0.2 mm and less than 0.3 mm, greater than 0.179 mm, and less than 0.28 mm, or greater than 0.179 mm and less than 0.26 mm. The lower limit of the body height at 6 days after hatching may be greater than 0.179 mm, greater than 0.19 mm, or greater than 0.2 mm. The upper limit of the body height at 6 days after hatching may be less than 0.3 mm, less than 0.28 mm, or less than 0.26 mm.

The body volume of the Artemia at 6 days after hatching may be greater than 0.099 $mm^3$ and less than 0.360 $mm^3$, greater than 0.105 $mm^3$ and less than 0.360 $mm^3$, greater than 0.11 $mm^3$ and less than 0.360 $mm^3$, greater than 0.099 $mm^3$ and less than 0.340 $mm^3$, or greater than 0.099 $mm^3$ and less than 0.320 $mm^3$. The lower limit of the body volume at 6 days after hatching may be greater than 0.099 $mm^3$, greater than 0.105 mm, or greater than 0.11 $mm^3$. The upper limit of the body volume at 6 days after hatching may be, for example, less than 0.360 $mm^3$, less than 0.340 $mm^3$, or less than 0.320 $mm^3$.

The body length, the body width, the body height, and the body volume may satisfy at least one of the above dimensions. The body length is L1 illustrated in FIG. 1A, the body width is L2 illustrated in FIG. 1A, and the body height is L3 illustrated in FIG. 1B. A boundary of presence and absence of pigment can be observed between the head side and the caudal furca side in the abdomen, and thus the body width and the body height can be determined by measuring at that part.

In addition, a ratio of the digestive tract width to the body length of the Artemia according to the present disclosure, that is, the digestive tract width/the body length, may be greater than 0.027 and less than 0.05, greater than 0.028 and less than 0.05, greater than 0.029 and less than 0.05, not less than 0.03 and less than 0.05, or greater than 0.03 and less than 0.05. The lower limit of the digestive tract width/the body length of the Artemia may be greater than 0.027, greater than 0.028, greater than 0.029, not less than 0.03, greater than 0.03, or greater than 0.031. The upper limit of the digestive tract width/the body length of the Artemia may be less than 0.05. The Artemia cultivated using the feed described above tends to have a large digestive tract width.

The Artemia contains fatty acids comprising oleic acid and arachidonic acid. The content of oleic acid relative to the total fatty acids contained in the Artemia, that is, the content of oleic acid, may be from 22 mass % to 40 mass %, from 25 mass % to 40 mass %, from 22 mass % to 35 mass %, or from 22 mass % to 30 mass % in the fatty acid composition of the Artemia. The lower limit of the content of oleic acid may be not less than 22 mass % or not less than 25 mass %. The Artemia with such a sufficiently high content of oleic acid can be suitably used as biological feed. The upper limit of the content of oleic acid may be not more than 40 mass %, not more than 35 mass %, or not more than 30 mass %.

The content of arachidonic acid relative to the total fatty acids contained in the Artemia, that is, the content of arachidonic acid, may be from 5 mass % to 30 mass %, from 5 mass % to 20 mass %, from 5 mass % to 15 mass %, from 8 mass % to 30 mass %, or from 11 mass % to 30 mass % in fatty acid composition of the Artemia. The content of arachidonic acid may be not less than 5 mass %, not less than 8 mass %, or not less than 11 mass %. The Artemia with such a sufficiently high content of arachidonic acid can be suitably used as biological feed. The content of arachidonic acid may be not more than 30 mass %, not more than 20 mass %, or not more than 15 mass %.

The total content of oleic acid and arachidonic acid relative to the total fatty acids contained in the Artemia may be from 25 mass % to 50 mass %, from 29 mass % to 50 mass %, from 32 mass % to 50 mass %, from 35 mass % to 50 mass %, from 25 mass % to 45 mass %, from 29 mass % to 45, from 32 mass % to 45 mass %, or from 35 mass % to 45 mass %. The lower limit of the total content of oleic acid and arachidonic acid may be not less than 25 mass %, not less than 29 mass %, not less than 32 mass %, or not less than 35 mass %. The Artemia with such a sufficiently high total content of oleic acid and arachidonic acid can be suitably used as biological feed. The upper limit of the total content of oleic acid and arachidonic acid may be not more than 50 mass % or not more than 45 mass %.

The content of each of oleic acid and arachidonic acid relative to the total fatty acids contained in Artemia can be measured by composition analysis of lipids extracted from Artemia. Gas chromatography can be used for the composition analysis.

The content of each of oleic acid and arachidonic acid relative to the total fatty acids contained in Artemia can be increased by feeding feed containing a given amount of at least one component selected from the group consisting of glycogen, zinc, taurine, and a protein. Examples of such feed include a mollusk-derived feed.

In addition, the Artemia according to the present disclosure has a body length of not less than 1.5 mm and may satisfy formula (6) below or can satisfy formula (1) below when the body length is x and a proportion of the body width is y. The body length of the Artemia may be not less than 2.0 mm and less than 6.0 mm, not less than 2.2 mm and less than 6.0 mm, not less than 2.0 mm and less than 5.0 mm, not less than 2.0 mm and less than 4.0 mm, or not less than 2.2 mm and less than 5.0 mm. The lower limit of the body length of the Artemia may be not less than 2.0 mm or not less than 2.2 mm. The upper limit of the body length of the Artemia may be less than 6.0 mm, less than 5.0 mm, or less than 4.0 mm.

$$y \geq -0.0346x+0.1501 \quad (6)$$

$$y \geq -0.0252x+0.136 \quad (1)$$

Artemia Population

In the case where an aggregate of a plurality of Artemia individuals is defined as an Artemia population, the Artemia population according to the present disclosure can satisfy at least one of an average body width of not less than 0.205 mm, an average body height of not less than 0.204 mm, and an average body volume of not less than 0.118 $mm^3$ at 6 days after hatching when not fewer than 100 individuals are measured. The rearing period is not less than 6 days from hatching and may be, for example, 7 days, 8 days, 9 days, 10 days, 11 days, or 12 days. The period can be extended as long as the Artemia population can be reared, but this may increase the production cost, and thus the period may be not more than 30 days, not more than 20 days, or not more than 15 days.

Such an Artemia population can be obtained by feeding the mollusk-derived feed during rearing. The mollusk-derived feed may be continuously fed during rearing but may be given in a period immediately before the Artemia population is used as feed for aquatic organisms. The preceding period may be, for example, one or multiple timings of 30 minutes before the use, from 30 minutes to 1 hour before the use, 1 hour to 3 hours before the use (excluding 1 hour before the use), 3 hours to 5 hours before the use (excluding 3 hours before the use), 5 hours to 8 hours before the use (excluding 5 hours before the use), 8 hours to 12 hours before (excluding 8 hours before the use), or 12 hours to 24 hours before the use (excluding 12 hours before the use). The Artemia population satisfying such conditions has a size suitable as feed for use in the cultivation of aquatic organisms. In addition, Artemia in the Artemia population grow larger as a whole compared with Artemia cultivated with a feed in the prior art, and thus a feed with a weight required for aquatic organisms can be prepared with a smaller number of Aremia individuals.

The number of Artemia individuals included in the Artemia population may be from 100 to 100 million, from 200 to 100 million, from 500 to 100 million, from 1000 to 100 million, from 10000 to 100 million, from 100 to 50 million, from 100 to 10 million, or from 100 to 5 million. The lower limit of the number of Artemia individuals may be not less than 100, not less than 200, not less than 500, not less than 1000, or not less than 10000. The upper limit of the number of Artemia individuals included in the Artemia population is not particularly limited and may be, for example, not more than 100 million, not more than 50 million, not more than 10 million, or not more than 5 million.

All Artemia individuals included in the Artemia population may be those reared in the same environment. The same environment includes, for example, not only rearing using one rearing tank but also rearing using a plurality of rearing tanks having the same size and placed in the same building, and feeding the same type of feed with the same timing.

All Artemia individuals included in the Artemia population may be those reared with the same feed. This can reduce size variation of Artemia individuals included in the Artemia population.

Embodiments of the present disclosure have been described above; however, the method for cultivating Artemia, a feed for Artemia, Artemia, and Artemia population according to the present disclosure are not limited to the above embodiments.

EXAMPLES

Example and Comparative Example

For Artemia in each evaluation below, Artemia salina was purchased from ISC Co., Ltd. and used. For oyster powder, Oyster Powder 500 g (trade name) was purchased from netshousha.com, and a powder passed through a sieve with a mesh size of 300 μm was used. For microalgae, Marine Omega A (trade name) was purchased from Marintech Co., Ltd. and used. The contents of zinc, glycogen, taurine, and protein contained in the oyster powder used are shown in Table 1. The content of zinc was measured by ICP emission spectrometry, and the content of glycogen was measured by the anthrone sulfate method. Taurine (amino acid) content was analyzed by pre-column derivatization high-performance liquid chromatography after pretreatment by hydrochloric acid hydrolysis. The content of protein is a value described in the instruction manual of the commercial product (Marine Omega A).

TABLE 1

| Component | Content | Content [mass %] |
|---|---|---|
| Zinc | 12.4 mg/100 g | 0.0124 |
| Glycogen | 7.2 g/100 g | 7.2 |

TABLE 1-continued

| Component | Content | Content [mass %] |
|---|---|---|
| Taurine | 20 mg/100 g | 0.02 |
| Protein | 70.9 g/100 g | 70.9 |

Evaluation 1

Two 200-L rearing tanks of the same shape into each of which 2 million individuals of the Artemia aged 0 days were placed were prepared; and the Artemia were cultivated while different feeds were each fed into each rearing tank. The Artemia were reared under rearing conditions of a seawater with a salt concentration of 31 to 38%, a DO of not less than 5.0, a water temperature of 28° C., and an aeration of 1 L/min. In one rearing tank, the oyster powder was used as the feed, and in the other, the microalgae were used as the feed.

The amounts of the feeds fed into the rearing tank were as follows. Into the rearing tank into which the microalgae were fed, 200 mL of the microalgae was fed per feeding to satiate. Into the rearing tank into which the oyster powder was fed, 30 g of the oyster powder was fed per feeding to satiate. Both feeds were fed twice daily in to each rearing tank at the same time points. The Artemia were sampled at 0 day after hatching and 6 days after hatching, hot water was dropped with a dropper to stop the motion, and the body lengths, body widths, and body heights were measured on microscopic images using an image analyzer VHX-900 (KEYENCE CORPORATION).

The body length L1, the body width L2, and the body height L3 illustrated in FIGS. 1A and 1B were measured. A boundary of presence and absence of pigment was able to be observed, and thus the body width and the body height were measured at that part. Ten individuals of the Artemia were selected from each rearing tank, and the body length, the body width, and the body height of each were measured, and the body volume was determined by calculating the body length×the body width×the body height. In addition, the average value of the body volumes of the 10 individuals was calculated. The results are shown in Table 2.

At 0 day after hatching, the Artemia fed with the oyster powder and the Artemia fed with the microalgae both had a body volume of 0.015 $mm^3$. At 6 days after hatching, the Artemia fed with the microalgae had a body volume of 0.099 $mm^3$. On the other hand, the Artemia fed with the oyster powder had a body volume of 0.118 $mm^3$.

This confirmed that the Artemia cultivated with the oyster powder as the feed had a larger body volume than the Artemia cultivated with the microalgae as the feed.

TABLE 2

| | | Body volume [$mm^2$] | |
|---|---|---|---|
| | Feed | 0 day after hatching | 6 days after hatching |
| Example | Oyster powder | 0.015 | 0.118 |
| Comparative Example | Microalgae | 0.015 | 0.099 |

Evaluation 2

Two 200-L rearing tanks of the same shape into each of which 2 million individuals of the Artemia aged 0 days were placed were prepared, and the Artemia was cultivated while different feeds were each fed into each rearing tank. The rearing conditions were the same as in Evaluation 1. In one rearing tank, the oyster powder was used as the feed, and in the other, the microalgae were used as the feed. That is, one is the Example and the other is a Comparative Example.

Figure 2:
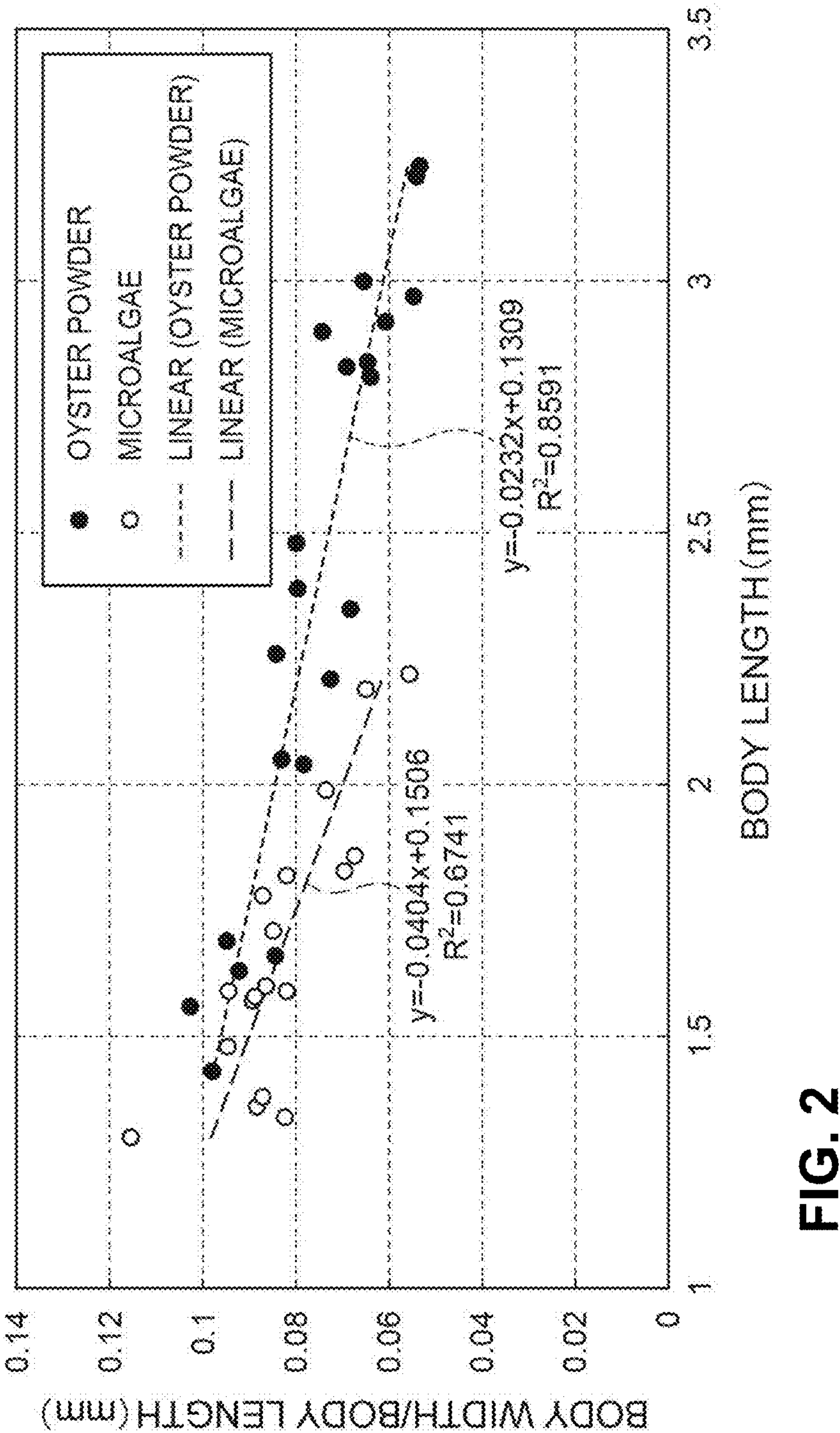
FIG. 2 is a graph showing the results of Evaluation 2, showing a ratio of body width to body length of Artemia during cultivation with each feed.

For the amount of feed fed into the rearing tank, to the rearing tank for feeding the microalgae, 200 mL of the microalgae was fed per feeding to satiate. To the rearing tank of the Example for feeding the oyster powder, 30 g of the oyster powder was fed per feeding to satiate. The feeds of the Example and the Comparative Example were both fed twice daily at the same time interval. At 6 days after hatching, 20 individuals of the Artemia were selected from the rearing tank fed with the oyster powder, and 13 individuals were selected from the rearing tank fed with the microalgae. The body length and body width of each were measured, and the ratio of the body width/the body length was calculated. At this time, individuals with a body length of not less than 1.5 mm were selected. The calculation results are shown in Table 3. The unit of "body length" and "body width" in Table 3 is "mm". Based on these results, the measurement results of each individual were plotted in FIG. 2 with the body length on the horizontal axis and the ratio of the body width/the body length on the vertical axis. Results of individuals with a body length of less than 1.5 mm are also shown in FIG. 2. In addition, the results of linear function approximation of the plotted data are shown in FIG. 2.

TABLE 3

| Oyster powder Feed | | | | Microalgae Feed | | | |
|---|---|---|---|---|---|---|---|
| No. | Body length | Body width | Body width/ body length | No. | Body length | Body width | Body width/ body length |
| 1 | 2.35 | 0.16 | 0.068 | 1 | 1.59 | 0.15 | 0.094 |
| 2 | 2.39 | 0.19 | 0.079 | 2 | 1.58 | 0.14 | 0.089 |
| 3 | 2.21 | 0.16 | 0.072 | 3 | 1.59 | 0.13 | 0.082 |
| 4 | 1.66 | 0.14 | 0.084 | 4 | 1.78 | 0.16 | 0.087 |
| 5 | 1.63 | 0.15 | 0.092 | 5 | 1.71 | 0.15 | 0.085 |
| 6 | 2.26 | 0.19 | 0.084 | 6 | 1.60 | 0.14 | 0.086 |
| 7 | 1.69 | 0.16 | 0.095 | 7 | 1.86 | 0.13 | 0.067 |
| 8 | 1.56 | 0.16 | 0.103 | 8 | 2.22 | 0.12 | 0.055 |
| 9 | 2.05 | 0.17 | 0.083 | 9 | 1.83 | 0.13 | 0.069 |
| 10 | 2.04 | 0.16 | 0.078 | 10 | 1.99 | 0.15 | 0.073 |
| 11 | 2.97 | 0.16 | 0.055 | 11 | 1.82 | 0.15 | 0.082 |
| 12 | 2.84 | 0.18 | 0.064 | 12 | 2.19 | 0.14 | 0.065 |
| 13 | 3.21 | 0.17 | 0.054 | 13 | 1.57 | 0.14 | 0.089 |
| 14 | 3.00 | 0.20 | 0.065 | | | | |
| 15 | 2.48 | 0.20 | 0.080 | | | | |
| 16 | 2.81 | 0.18 | 0.064 | | | | |
| 17 | 2.90 | 0.22 | 0.074 | | | | |
| 18 | 2.83 | 0.20 | 0.069 | | | | |
| 19 | 2.92 | 0.18 | 0.061 | | | | |
| 20 | 3.23 | 0.17 | 0.053 | | | | |

Based on FIG. 2. some of the Artemia cultivated using the oyster powder feed can have a body length of not less than 1.5 mm and can satisfy formula (1) below when the body length is x mm and the ratio of the body width/body length is y.

$$y \geq -0.0232x + 0.1309 \tag{1}$$

As a result of linear function approximation in the body length range of not less than 1.5 m, the Artemia cultivated with the oyster powder was approximated by formulas (2) and (3) below.

$$y = -0.0232x + 0.1308 \quad (2)$$

$$R^2 = 0.8381 \quad (3)$$

In addition, the Artemia cultivated with the microalgae was approximated by formulas (4) and (5) below.

$$y = -0.0404x + 0.1506 \quad (4)$$

$$R^2 = 0.6741 \quad (5)$$

On the other hand, only the Artemia cultivated using the oyster powder was able to achieve the range satisfying formula (6) below, and the Artemia cultivated with the microalgae failed to achieve the range satisfying formula (6). In particular, this tendency was evident for the Artemia with a body length of not less than 2 mm.

$$y \geq -0.0346x + 0.1501 \quad (6)$$

Evaluation 3

Two rearing tanks of the same shape into each of which 2 million individuals of the Artemia aged 0 days were each placed were prepared, and the Artemia were cultivated while different feeds were each fed into each rearing tank. The rearing conditions were the same as in Evaluation 1. In one rearing tank, the oyster powder was used as the feed, and in the other, the microalgae were used as the feed. That is, one is the Example and the other is the Comparative Example. For the amount of feed fed into the rearing tank, to the rearing tank for feeding the microalgae, 200 mL of the microalgae was fed per feeding to satiate. To the rearing tank of Example for feeding the oyster powder to the rearing tank, 30 g of the oyster powder was fed per feeding to satiate. The feeds of the Example and Comparative Examples were both fed twice daily at the same time intervals. At 6 days after hatching, the Artemia in each rearing tank was collected, lipids were extracted, and then the fatty acid composition was analyzed by the GC-FID method. Among the total fatty acids obtained, the measurement results of the proportions of oleic acid and arachidonic acid are shown in Table 4.

TABLE 4

| | | Analysis results | | |
|---|---|---|---|---|
| | Feed | Oleic acid [mass %] | Arachidonic acid [mass %] | Oleic acid + arachidonic acid [mass %] |
| Example | Oyster powder | 25.91 | 11.61 | 37.52 |
| Comparative Example | Microalgae (Marine Omega A) | 20.36 | 3.57 | 23.93 |

The amount of oleic acid was 25.91 mass % in the Artemia fed with the oyster powder feed and 20.36 mass % in the Artemia fed with the microalgae feed. The amount of arachidonic acid was 11.61 mass % in the Artemia fed with the oyster powder feed and 3.57 mass % in the Artemia fed with the microalgae feed.

Thus, this data confirmed the increase in the proportions of oleic acid and arachidonic acid in the Artemia fed with the oyster powder compared with the Artemia fed with the microalgae. According to the present disclosure, there are provided the technique related to stably cultivating Artemia of an appropriate size, and the Artemia and the Artemia population cultivated based on this technique.

The invention claimed is:

1. A method for cultivating Artemia in a rearing tank, the method comprising:

providing a feed into the rearing tank, wherein individuals of the Artemia have been placed into the rearing tank, wherein the feed comprises (i) glycogen at a content from 1.1 mass % to 27.6 mass % on a total amount basis, (ii) zinc at a content from $5.0\times10^{-3}$ mass % to $251.1\times10^{-3}$ mass % on a total amount basis, (iii) taurine at a content from 0.01 mass % to 6.9 mass % on a total amount basis; and (iv) protein at a content from 38.7 mass % to 88.4 mass % on a total amount basis, and wherein the feed is provided into the rearing tank from 0 days old after hatching.

2. The method for cultivating Artemia according to claim 1, wherein the feed comprises a mollusk-derived feed.

3. The method for cultivating Artemia according to claim 2, wherein the mollusk-derived feed comprises a mollusk-derived component in an amount of 5 mass % to 100 mass %.

4. The method for cultivating Artemia according to claim 2, wherein the mollusk-derived feed is a shellfish-derived material.

5. The method for cultivating Artemia according to claim 2, wherein the mollusk-derived feed is a powder.

6. The method for cultivating Artemia according to claim 2, wherein the mollusk-derived feed comprises particles, and the particles have an average particle size of 10 μm to 300 μm.

7. The method for cultivating Artemia according to claim 1, wherein the feed is provided into the rearing tank until the Artemia is 25 days old.

8. The method for cultivating Artemia according to claim 1, wherein the feed is derived from a mollusk selected from the group consisting of Solenogastres, Caudofoveata, Polyplacophora, Monoplacophora, Bivalvia, Scaphopoda, Gastropoda, and Cephalopoda.

9. The method for cultivating Artemia according to claim 8, wherein the feed is provided into the rearing tank until the Artemia is 25 days old.

10. The method for cultivating Artemia according to claim 8, wherein the feed comprises a mollusk-derived component in an amount of 5 mass % to 100 mass %.

11. The method for cultivating Artemia according to claim 8, wherein the feed comprises particles, and the particles have an average particle size of 10 μm to 300 μm.

* * * * *